No. 752,161. PATENTED FEB. 16, 1904.
F. B. HARRISON & L. Y. WILLIAMS.
LUBRICATING DEVICE FOR CAR AXLE JOURNALS.
APPLICATION FILED APR. 28, 1903.
NO MODEL.

Witnesses
Chas. K. Davies.
Chas. S. Mason

Inventors.
F. B. Harrison
L. Y. Williams
by F. E. Stebbins
Attorney

No. 752,161.  
Patented February 16, 1904.

UNITED STATES PATENT OFFICE.

FRANK BENJAMIN HARRISON AND LACEY YEA WILLIAMS, OF TOLEDO, OHIO.

LUBRICATING DEVICE FOR CAR-AXLE JOURNALS.

SPECIFICATION forming part of Letters Patent No. 752,161, dated February 16, 1904.

Application filed April 28, 1903. Serial No. 154,716. (No model.)

*To all whom it may concern:*

Be it known that we, FRANK BENJAMIN HARRISON and LACEY YEA WILLIAMS, citizens of the United States, residing at Toledo, in the county of Lucas and State of Ohio, have invented new and useful Improvements in Lubricating Devices for Car-Axle Journals, of which the following is a specification.

The object of our invention is the provision of certain improvements in connection with a lubricating device patented to us on February 10, 1903, No. 720,026, whereby the manufacture of the lubricating-pan shall be simplified and cheapened, the spring arrangement be rendered more efficient and durable and the waste for absorbing the lubricant be held within the pan and be prevented from working over the rear wall of the said pan.

Our invention consists in a pan of sheet metal and having detachable housings inclosing springs, which latter bear at their lower ends against the posts.

It further consists in a pan having at its rear wall means for retaining the waste.

Finally, it consists in certain novelties of construction and combinations of parts hereinafter set forth and claimed.

The accompanying drawings illustrate our improvements constructed according to the best modes we have so far devised for the physical embodiment thereof and applied and combined in a practical and desirable manner.

Figure 1:
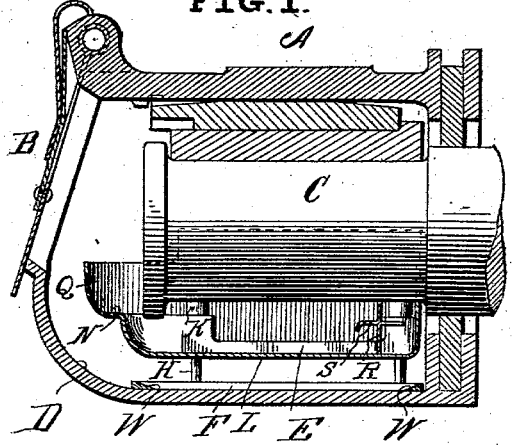
Figure 2:
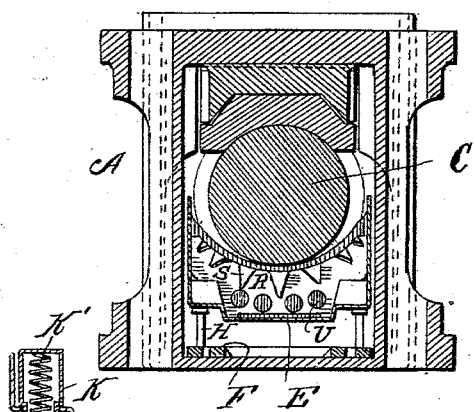
Figure 7:
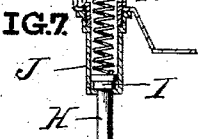
Figure 3:
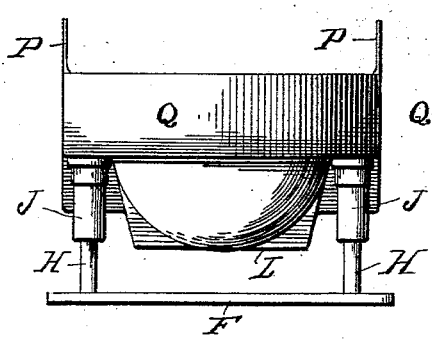
Figure 4:
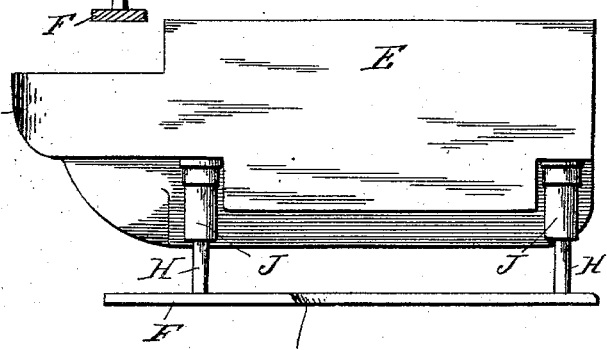
Figure 5:
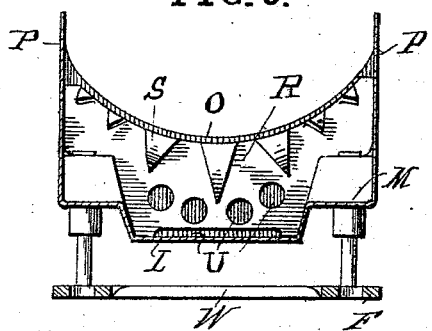
Figure 6:
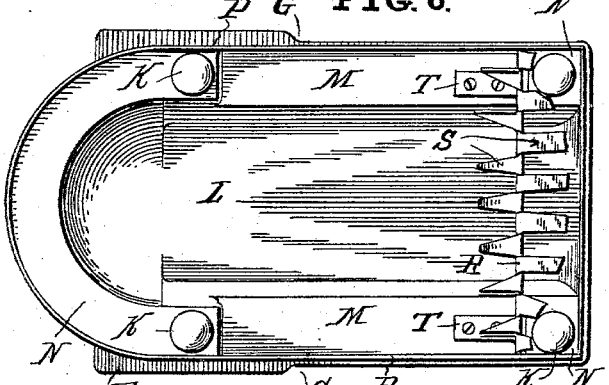

Figure 1 is a longitudinal sectional view of a journal-box, showing the pan within the same and in the position relative to the journal which it will occupy when in use. Fig. 2 is a cross-section of Fig. 1. Fig. 3 is an end view in elevation of the pan removed from the box. Fig. 4 is a side view in elevation. Fig. 5 is a cross-section of the pan, showing the waste-retaining means. Fig. 6 is a top plan view of the pan. Fig. 7 is a section through one of the spring-housings and the body of the pan.

Referring to the several figures, the letter A designates a journal-box of the Master Car-Builders' type; B, the journal-box lid; C, the journal; D, the curved interior surface of the end of the box; E, the pan, which is made of sheet metal in one piece struck up or fashioned between dies, whereby light weight, great strength, and cheapness of first cost are secured; F, a skeleton base having the end portions cut away or beveled at W W, so that the bottom of the pan may be depressed to the bottom of the box when the pan is to be removed, the curved surfaces of the said pan engaging the beveled surfaces of the base-pieces when the pan is lowered; G, the cut-away or narrowed portions of the side pieces of the skeleton base; H, the posts, rigidly secured to the base; I, the heads of the posts; J, the lower parts of the casings or housing for the springs, which casings are flanged and interiorly threaded at the upper ends; K, the upper parts of the housings threaded exteriorly at their lower ends and passed through holes made in the pan, so as to engage the threads of the lower parts of the housings and clamp the metal of the pan adjacent the holes; K', coiled springs; L, the bottom of the pan; M, the struck-up edges of the pan; N, the struck-up rear corners and front end of the pan, which prevent the longitudinal movement of the waste within the pan; O, the end wall of the pan having its edge curved to match the journal; P, the sides of the pan extended upwardly adjacent the surfaces of the sides of the journal; Q, the cup-shaped end of the pan, which is to receive the lubricant when poured in; R, a waste-retainer, made of sheet metal in this example; S, prongs, made by slitting the metal and bending portions thereof between the slits alternately downward and in opposite directions, as shown; T, lugs, by which the retainer is secured by screws or rivets to the pan, and U are holes or slots in the retainer to allow the lubricant which may find its way to the rear of the pan to pass forwardly to the space in the center or front portion of the pan.

It will be observed that the pan receives and retains oil or other lubricating material which will be absorbed in part by waste or other textile material inserted between the bottom of the pan and the journal. The springs will hold the textile material in frictional contact with the under surface of the journal at all times, and the drip from the journal will fall by gravity into the pan. The prongs of the retainer will engage and penetrate the waste and prevent it working over the rear wall of the pan and conveying oil to the bottom of the box. The entire device will be held in its proper position relative to the journal, inasmuch as the sides of the base are in contact with the inner surfaces of the box or adjacent thereunto, and the curved surface at the end of the box on the inside will prevent longitudinal movement of the device toward the front end of the box. As shown in Fig. 1, the pan and base are of such shape that they cannot be removed from or inserted through the opening in the end of the box and adjusted without removing the wedge and brass from the journal and thereafter lowering the box upon the journal. This feature of structure and combination is of importance, as it prevents the purloining of the lubricating device by unauthorized persons. The springs being housed will be protected from injury and will not become inoperative.

From the foregoing description, taken in connection with the drawings, it becomes obvious that we have produced a lubricating device embodying improvements which fulfils all the conditions set forth as the end and object of our invention. The saving in oil and cotton-waste by the use of our lubricator is especially notewothy.

While we have specifically illustrated and described only one example of each of our improvements, we do not thereby intend to limit the scope of the same to the exact or specific details, inasmuch as in practical applications changes may be introduced and substitutions of parts made without constituting substantial departures.

What we claim as new, and desire to secure by Letters Patent, is—

1. The combination with a closed journal-box and journal, of a lubricating-pan entirely closed at the bottom and open at the top to receive waste and a journal; four housings detachably secured to the four corners of the pan; a spring in each housing; and posts each having an end located in the housing and bearing against a spring.

2. The combination with a lubricating-pan having holes, of housings each made in two parts and detachably secured together, springs in the housings, posts bearing against the springs, and a base to which the posts are secured.

3. The combination with a lubricating-pan having holes, of a base, posts, springs, and housings for the springs; each housing comprising a lower threaded portion and an upper threaded portion between which the metal of the pan is clamped, and the ends of said posts located within the lower portions of housings and engaging the springs.

4. The combination with a journal-box, journal and spring-supported lubricating-pan, of waste-retaining means located adjacent the rear wall of the pan and said means having prongs.

5. The combination with a spring-supported lubricating-pan, of waste-retaining means consisting of a sheet-metal plate having its edge slit and portions of the metal bent alternately in opposite directions and at angles to the plate for the purpose set forth.

6. A lubricating-pan having a waste-retainer adjacent its rear wall with openings therein to allow the lubricant to pass from the rear of the retainer to the front portion of the pan.

In testimony whereof we affix our signatures in presence of two witnesses.

FRANK BENJAMIN HARRISON.
LACEY YEA WILLIAMS.

Witnesses:
LEOLA G. WENDELL,
F. C. HARRISON.